United States Patent
Butzer et al.

(10) Patent No.: US 10,958,652 B1
(45) Date of Patent: Mar. 23, 2021

(54) SECURE COMMUNICATION LINK FOR INTEGRATED COMPUTING SYSTEM MANAGEMENT AND METHOD OF OPERATING THE SAME

(71) Applicant: VCE IP Holding Company LLC, Richardson, TX (US)

(72) Inventors: Daniel J. Butzer, McKinney, TX (US); Jeffery Hayward, Lucas, TX (US); Mark S. Tuck, Allen, TX (US); Jeremy Etheredge, McKinney, TX (US)

(73) Assignee: EMC IP Holding Company LLC, Round Rock, TX (US)

( * ) Notice: Subject to any disclaimer, the term of this patent is extended or adjusted under 35 U.S.C. 154(b) by 403 days.

(21) Appl. No.: 15/587,936

(22) Filed: May 5, 2017

(51) Int. Cl.
*H04L 29/06* (2006.01)
*G06Q 20/40* (2012.01)

(52) U.S. Cl.
CPC ........... *H04L 63/10* (2013.01); *G06Q 20/405* (2013.01)

(58) Field of Classification Search
CPC .................................................. G06Q 20/405
USPC ........................................................ 726/4
See application file for complete search history.

(56) References Cited

U.S. PATENT DOCUMENTS

| | | | | |
|---|---|---|---|---|
| 7,139,764 | B2* | 11/2006 | Lee ..................... | G06F 16/2465 |
| 7,991,672 | B2* | 8/2011 | Crowder ............... | G06Q 40/06 705/36 R |
| 2010/0169475 | A1* | 7/2010 | Woundy .............. | H04L 41/0896 709/224 |
| 2012/0066259 | A1* | 3/2012 | Huber ................... | G06Q 30/02 707/776 |
| 2013/0097306 | A1* | 4/2013 | Dhunay .............. | H04L 12/6418 709/224 |
| 2015/0088834 | A1* | 3/2015 | Wright, Sr. ......... | G06F 16/2379 707/689 |

* cited by examiner

*Primary Examiner* — Jahangir Kabir
(74) *Attorney, Agent, or Firm* — Polsinelli PC

(57) ABSTRACT

An integrated computing system configuration system includes a computing system that executes an application to receive, via user input, a request to provision a component of an ICS, and determine whether the component has been sanctioned for use with the ICS by comparing identifying information associated with the component with a plurality of sanctioned component records stored in a memory of the computing system. When the component has been sanctioned for use with the ICS, the application allows provisioning of the component, and when the component has not been sanctioned for use with the ICS, provisioning of the component is restricted.

20 Claims, 9 Drawing Sheets

SECURE COMMUNICATION LINK FOR INTEGRATED COMPUTING SYSTEM MANAGEMENT AND METHOD OF OPERATING THE SAME

TECHNICAL FIELD

Aspects of the present disclosure relate to computing devices and, in particular, to a secure communication link for integrated computing system (ICS) management and method of operating the same.

BACKGROUND

Computing environments used by enterprises, such as corporations and universities, are often provided by multiple computing devices that function in a collaborative manner to meet the computing resource needs of the enterprise. With the advent of the cloud and increased needs for stable computing environments, integrated computing systems, such as converged infrastructures, were introduced that provide a standardized package of components combined into a single, optimized computing solution. Nevertheless, because the resource needs of each user is often unique, customization of these integrated computing systems remains an area for advancement.

SUMMARY

According to one aspect of the present disclosure, an integrated computing system (ICS) configuration system includes a computing system that executes an application to receive, via user input, a request to provision a component of an ICS, and determine whether the component has been sanctioned for use with the ICS by comparing identifying information associated with the component with a plurality of sanctioned component records stored in a memory of the computing system. When the component has been sanctioned for use with the ICS, the application allows provisioning of the component, and when the component has not been sanctioned for use with the ICS, provisioning of the component is restricted.

BRIEF DESCRIPTION OF THE DRAWINGS

The various features and advantages of the technology of the present disclosure will be apparent from the following description of particular embodiments of those technologies, as illustrated in the accompanying drawings. Also, in the drawings the like reference characters may refer to the same parts throughout the different views. The drawings depict only typical embodiments of the present disclosure and, therefore, are not to be considered limiting in scope.

FIG. 10 illustrates an example ICS management tool computing device that may be used to execute the ICS management tool according to one embodiment of the present disclosure.

DETAILED DESCRIPTION

Figure 1A:
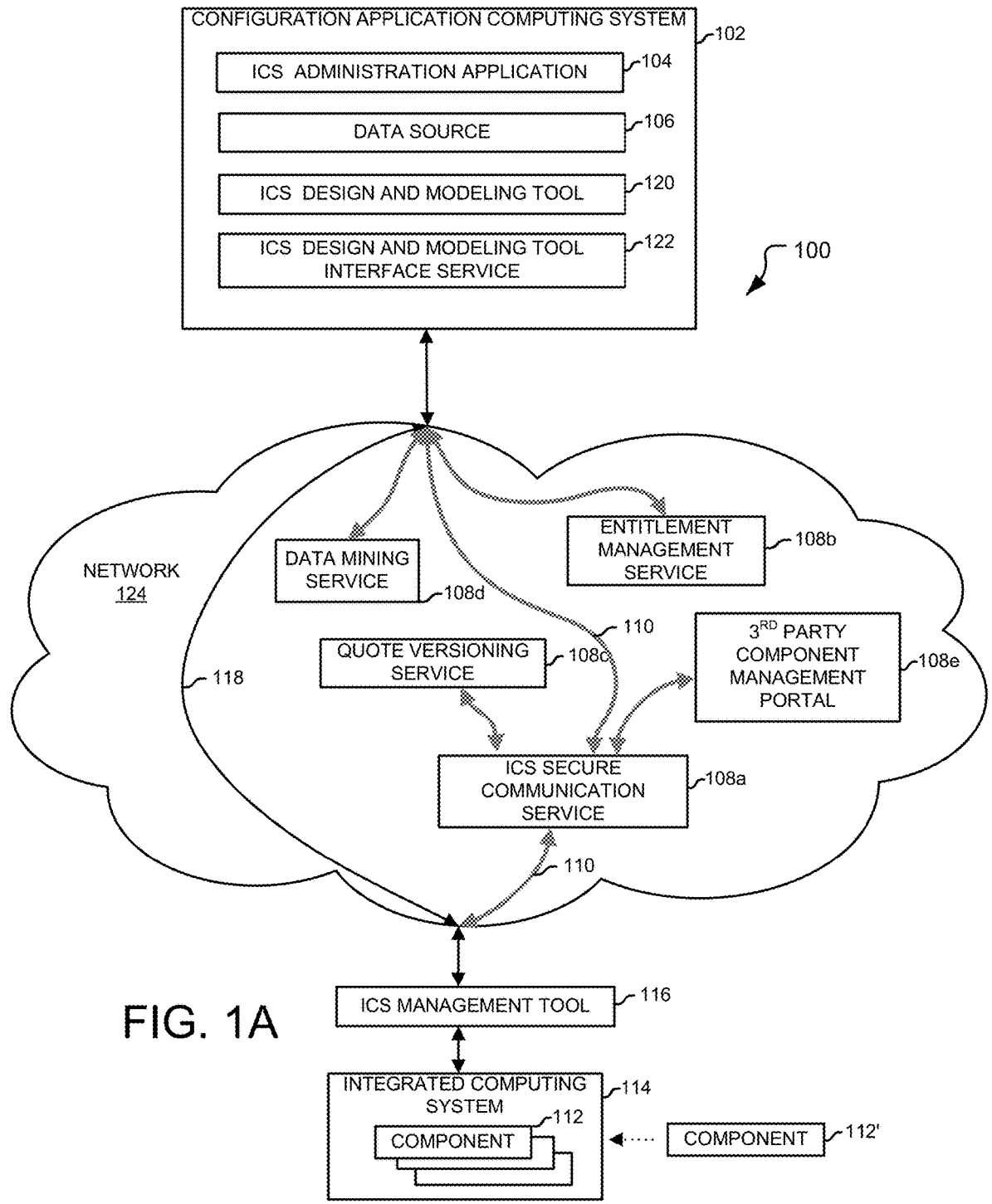
FIGS. 1A and 1B illustrate an example integrated computing system (ICS) configuration system and associated data source according to one embodiment of the present disclosure.

Embodiments of the present disclosure provide a secure communication link for managing an integrated computing system (ICS) and related method that provides performing one or more administrative functions associated with the management of an ICS, such as verification of entitlement rights for components as they are added or removed from an ICS and/or providing analytics to generate intent elements that can be used to enhance customer satisfaction by suggesting certain upgrade configurations based upon the usage of the ICS. Whereas conventional ICS management systems have been developed for managing ICSs, they have been limited in their effectiveness due mainly to their inability to convey confidential, proprietary information over publicly available communication mediums, such as the Internet. Embodiments of the present disclosure provide a solution to this problem, among other problems, by providing a secure communication link that can interface with one or more services provided by a vendor of the ICS in a secure manner so that heretofore unavailable configuration options are made available to a customer of the ICS.

Integrated computing systems typically include multiple individual computing components that have been integrated into a completed (e.g., turn-key) product that functions in a collaborative manner to perform one or more distributed services. For example, a typical integrated computing system may include compute resources for execution of application, storage resources for persistent storage of information processed by the compute resources, and network resources for communicatively coupling certain groups of compute resources with certain other storage resources to perform execution of the applications in a structured and cost-efficient manner. In many cases, it has been advantageous from a business perspective to utilize components from multiple different vendors based upon various factors that may include, for example, feature sets provided by various product offerings from certain vendors, and competitive prices at which these feature sets are provided. For example, a typical integrated computing system may be implemented with a sub-system having compute resources provided by one manufacturer (e.g., Dell™), another sub-system having network resources provided by another manufacturer (e.g., Cisco™), and yet another sub-system having storage resources provided by yet another manufacturer (e.g., EMC Corporation™) that utilize their competitive features in a synergistic manner to provide an optimal configuration for the integrated computing system.

Tools have been developed for managing the components of an ICS. Management features provided by these tools may include, for example, provisioning components, de-provisioning components, configuring one or more operational parameters on each component, and the like. Examples, of such ICS management tools include a vSphere™ software suite, a VMware™ software suite, and/ or a vCenter™ software suite, which are available from VMware Corporation in Palo Alto, Calif. Another example of such an ICS management tool includes a Vision™ software suite available from Dell/EMC Corporation. The vSphere™, VMware™, vCenter™, and Vision™ ICS management tools may be useful for obtaining component information that spans multiple differing technologies and vendor brand types. In certain cases, these tools may discover and record component information using one or more component management systems that are ideally suited for use with a particular vendor, such as a Cisco Unified Computing System (UCS) manager provided by Cisco Systems, Inc., of San Jose, Calif.

Nevertheless, the use of these tools has been limited. For example, in many cases, an ICS may need to be upgraded following deployment for various reasons, such as increased computing needs, replacement of obsolete components, catastrophic failure, and the like. Conventional techniques for upgrading ICSs have often involved manual configuration changes to the ICS followed by a manual purchasing process, which is often a cumbersome affair. Known secure communication links could be used, but they are limited in that they are not designed to readily interface with many modern ICS management systems that are expanding on a daily basis to handle the ever-growing needs of ICS users.

Additionally, piracy of deployed ICSs is a known problem that challenges ICS vendors. In general, piracy occurs when a customer of an ICS adds components to a deployed ICS without providing monetary compensation to the vendor of the ICS. In many cases, an ICS is a combination of readily available components that are configured together in a synergistic manner to provide enhanced computing resources for a user (e.g., a customer). From a vendor's standpoint, the value added by the ICS vendor is provided by selection of a particular configuration that allows those components to function properly together. Thus, once a proper, workable configuration is determined by the ICS vendor, the illicit addition of additional components outside the purview of the vendor is often easily performed, which in turn circumvents the intrinsic value that would otherwise be provided by the vendor for the development of the ICS.

Figure 1B:
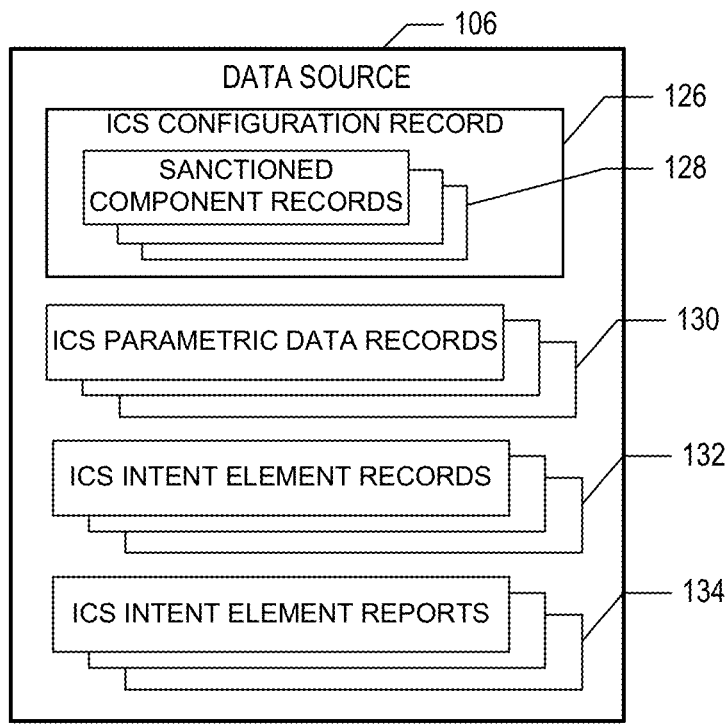
Figure 1C:
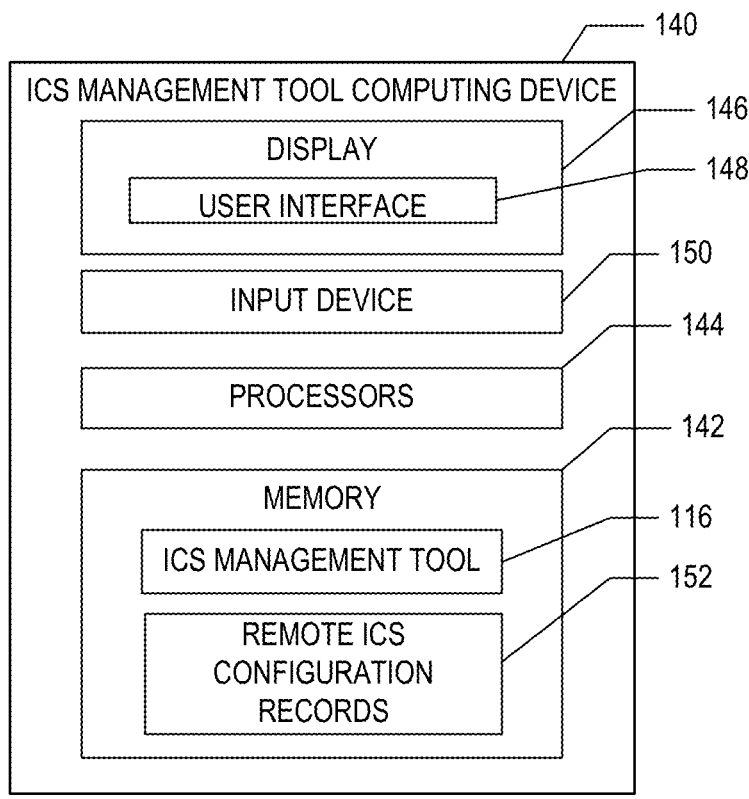

FIGS. 1A through 1C illustrate an example integrated computing system (ICS) configuration system 100 with a secure communication link according to the teachings of the present disclosure. The integrated computing system configuration system 100 addresses the challenges discussed above with conventional systems among other benefits and solutions. The system 100 includes an ICS management tool administration computing device 102 having an ICS management tool administration application 104, and a data source 106. As will be described in detail below, the ICS management tool administration application 104 securely communicates with one or more ICS-based services 108 using a secure communication link 110 for providing one or more administrative functions for an ICS 114, while providing a non-secured communication link 118 for other functions that may not require a secure communication medium.

According to one embodiment of the present disclosure, one administrative function includes verification that a newly added component 112', which has been added to an ICS 114 has been sanctioned for use by a vendor of the ICS 114. In general, the vendor refers to an entity that develops a configuration of components 112, configures those components 112 for use in the ICS 114, and provides a completed, working ICS 114 to a customer at a specified monetary price as indicated in an ICS configuration record 126. Because the value added by the vendor lies principally in the design of the ICS's configuration and not necessarily in the physical components per se, it would be beneficial to ensure that management of the components 112 of the ICS 114 is restricted to only those components 112 that have been sanctioned for use by the vendor. Embodiments of the present disclosure provide a solution to this problem by implementing a secure communication link 110 that is used by the system 100 to, when a component 112 is to be provisioned by an ICS management tool 116, verify that the component 112 is sanctioned for use (e.g., exists) in the ICS configuration record 126 associated with that ICS 114. If so, the ICS management tool 116 allows provisioning of the component, and restricts provisioning of the component otherwise.

According to another embodiment of the present disclosure, one administrative function includes gathering and publishing analytics data associated with the usage of the ICS 114. To perform the analytics, the system 100 may communicate with a data mining service 108 using the secure communication link 110. The data mining service 108 obtains information associated with the operation of the ICS 114 to infer one or more intent elements (e.g., usage characteristics) about the ICS 114 as well as how the ICS 114 is being managed by the customer. Additional information about the analytics gathering and publishing function will be described in detail herein below.

According to another embodiment of the present disclosure, another administrative function may include online provisioning of the ICS 114. In many cases, each ICS is customizable to a relatively large degree such that most ICS's differ at least slightly from one another. Additionally, deployment of ICSs is typically performed by provisioning the components 112 of the ICS 114 after the ICS 114 has been physically delivered to the customer site in which software and other provisioning functions (e.g., provisioning scripts) are downloaded via a publicly available communication network, such as the Internet. Thus, it would be beneficial to securely transfer a unique identity of the ICS 114 so that appropriate software and other provisioning mechanisms may be downloaded using an otherwise insecure communication medium. Embodiments of the present disclosure provide a solution to this problem by using the secure communication link 110 convey unique identifying information associated with the ICS 114 to a repository where appropriate software and other provisioning functions are stored so that the ICS management tool 116 may download the appropriate software and provisioning mechanisms to that ICS 114 to facilitate its provisioning.

Although the example above describes a process for provisioning a newly delivered ICS 114, other embodiments contemplate that the secure communication link 110 may also be used for other provisioning functions, such as one where the ICS 114 may be upgraded following deployment. For example, when one or more additional components 112 are added to the ICS 114, an administrator of the ICS 114 may use the secure communication link 110 for conducting a financial transaction to provide entitlement rights for using those components 112 with the ICS 114. Additionally, the ICS management tool 116 may occasionally perform audits of the components 112 in the ICS 114 via the secure communication link 110 to ensure that only sanctioned components 112 are allowed to be used in the ICS 114.

The components 112 may include any type that can be integrated into a customized integrated computing system 114. The components 112 may include, for example, data processing devices, data storage devices, servers, networking equipment, environmental control systems, and/or power management systems. In one embodiment, the components 112 may also include any type of hardware that provides physical resources that support virtual objects, such as virtual machines, virtual switches, and/or virtual storage objects. These virtual objects may also include logical configuration constructs, such as storage partitions, port groups, virtual private clouds, virtual local area networks (LANs), and private virtual data centers (PVDCs).

The components 112 used for implementing the integrated computing system 114 are selected from among multiple components 112 provided by their component manufacturers. The components 112 may include individual components, such as stand-alone computing devices (e.g., a personal computer, such as a laptop or notebook computer, a workstation, or other processing device such as a tablet computer), or a structured combination of computing devices, such as sub-systems involving multiple computing devices, such as a blade array comprising multiple computing devices, a storage array network (SAN) having multiple hard disks, a network switch array having multiple independent switches (e.g., routers), and the like that are each housed in an enclosure and controlled by at least one control system, such as a dedicated computing system configured in the housing. For example, the components 112 may include multiple blades of a blade array provided by one component manufacturer (e.g., Dell™) multiple network switches provided by another component manufacturer (e.g., Cisco™), and/or multiple storage devices configured in a storage sub-system provided by yet another component manufacturer (e.g., EMC Corporation™).

In one aspect, the customized integrated computing system 114 includes a combination of these devices that are packaged and interconnected in a standardized manner for ease of maintenance and use. Customized integrated computing systems 114 such as these are often implemented in environments where relatively high reliability and/or availability are desired, such as in an enterprise environment. In one embodiment, the integrated computing system 114 includes a converged infrastructure (CI), such as one of multiple CIs provided by the Dell/EMC Corporation in Hopkinton, Mass. Nevertheless, it is contemplated that any computing infrastructure, such as a computer cluster, computing grid, blade array, and/or other computing infrastructure may be configured using the teachings of the present disclosure.

The system 100 includes an ICS modeling tool 120 and an ICS modeling tool interface service 122 that processes component specifications associated with each component 112 to validate their interoperability with one another, and that the integrated computing system 114 meets certain specified architectural standards. In one embodiment, the ICS modeling tool 120 comprises an XACT™ modeling tool, while the ICS modeling tool interface service 122 comprises a Customer Experience Service Bus™, which are both provided by the Dell/EMC Corporation, which is headquartered in Hopkinton, Mass.

The ICS modeling tool 120 and the ICS modeling tool interface service 122 may be used for deriving additional components 112 to be used with the ICS 114. For example, when the modeling tool 120 encounters a certain quantity of component specifications associated with a type of hard disk drive, it may verify that physical structures for housing the hard disk drives are present in the ICS configuration record 126 associated with the ICS 114, that sufficient electrical power sources are available, and/or that any particular configuration arrangement (e.g., unified storage arrangement) specified in the ICS configuration record 126 is compatible with those type of hard disk drives. In a likewise manner, the modeling tool 120 verifies that each component specification included in the ICS configuration record 126 is compatible with the other component specifications to ensure that the ICS configuration record 126 provides a validated system. A valid integrated computing system configuration generally refers to a combined set of components 112 that, when implemented in a customized integrated computing system, have been validated to be interoperable with one another, and that the components collectively function at one or more performance levels desired by the user of the customized integrated computing system.

In one aspect, the modeling tool 120 may receive component specifications associated with the components 110 provided by their respective component manufacturer, and abstract manufacturer specific information (e.g., make, model, part number, etc.) to include only its functionality, and validates the functionality of each component 112 with one another to ensure compatibility among each component. Thereafter, the modeling tool 120 determines a personality of the ICS 114 from which certain rules may be applied to ensure that the base integrated computing system configuration meets certain architectural standards. Additionally, the modeling tool 120 may, upon determination of the personality of the integrated computing system 114, optionally suggest other components 112 that may be added, removed, and/or modified to provide an upgraded configuration for the ICS 114.

The ICS management tool 116 manages the operation of the resources 112 of the ICS 114, which may include, for example, provisioning resources, de-provisioning resources, configuring one or more operational parameters on each resource 112, and the like. Any suitable type of operations management application may be implemented with the teachings of the present disclosure. In one embodiment, the ICS management tool 116 includes a VCE Vision™ software suite that is available from Dell/EMC Corporation, which is headquartered in Hopkinton, Mass.

In one embodiment, the ICS management tool 116 communicates with the modeling tool 120 to design an upgrade ICS configuration for the ICS 114. For example, after an ICS has been deployed by a customer over an extended period of time, it has been determined that physical storage for the ICS 114 has been operating at over 85 percent, and that anticipated usage may extend beyond the existing storage capacity within a few months. Therefore, the administrator of the ICS 114 may communicate with the modeling tool 120 via ICS management tool 116, to generate an upgraded ICS configuration having increased storage capacity while maintaining a valid ICS configuration.

According to one embodiment of the present disclosure, the administrator may also conduct a financial transaction for obtaining entitlement rights to use the new configuration via the secure communication link 110. In one embodiment, the system 100 may include an entitlement management service 108 that manages entitlement rights for the ICS 114. In general, an entitlement right refers to a license to use a component 112 as well as how that component are used in the ICS 114. When the financial transaction is conducted for the new component 112, the ICS management tool 116 may communicate with the entitlement management service 108 to perform the financial transaction and update the ICS configuration record 126 to include the purchased component 112 as a sanctioned component of the ICS 114.

Any suitable type of entitlement management service may be used. In one embodiment, the entitlement management service 108 includes a Flexera™ online entitlement rights management service that is available from Flexera Software Corporation, which is located in Itasca, Ill. The Flexera™ service provides software licensing, compliance and installation solutions for users, which may include application producers as well as end users (e.g., consumers) of licensed products.

In one embodiment, the system 100 may also include a quote versioning service 108 that maintains an accurate, up-to-date repository for components 112 that have been sanctioned for use with the ICS 114. In general, the quote versioning service 108 maintains a list of all sanctioned components 112 (e.g., a bill-of-materials, a manifest, etc.) of the ICS 114. When a new component 112 is purchased by the customer, the quote versioning service 108c updates the repository associated with that ICS 114 so that the newly added component will be verified for use on ensuing requests for provisioning that component 112. In one embodiment, the quote versioning service 108c includes a MyQuotes™ online service that is provided by Dell/EMC Corporation, which is located in Hopkinton, Mass.

In one embodiment, the system 100 communicates, using the secure communication link 110, with one or more third party component management portal services 108e to provide information about certain components 112 used in the ICS 114. For example, a certain manufacturer of a component 112 that may be used in the ICS 114 may publish technical information and other associated information about that component 112 on the third party component management portal service 108. The system 100 may access this information when considerations are being made for use of a particular component 112 so that the customer may be provided with the latest information available for that component 112 for determining whether to include the component 112 in the ICS 114. One example type of third party component management portal service 108e includes a Service 360™ customer portal provided by Dell Corporation, which exposes information about the products it sells to potential customers.

In one embodiment, the system 100 may also communicate with a data mining service 108 using the secure communication link 110. The data mining service 108 obtains information associated with the operation of the ICS 114 to infer one or more intent elements (e.g., characteristics) about the ICS 114 as well as how the ICS 114 is being managed by the customer. For example, the data mining service 108 may determine over a specified period of time that the customer is using the modeling tool 120 to experiment with several upgrade enhancements to the compute portion of the ICS 114 for enhancing its processing power to handle a new business venture that the customer is planning to roll out. The ICS management tool administration application 104 may communicate with the data mining service 108 via the secure communication link 110 to obtain one or more intent elements associated with that behavior exhibited by the use of the ICS 114, and generate a report that may either be sent to the customer and/or to a sales force of the ICS provider indicating that sales personnel may assist the customer in deriving an upgrade configuration that optimally meets their processing needs.

The secure communication link 110 may comprise any type of communication link that provides a secure, proprietary connection between the ICS management tool 116 and the ICS management tool administration application 104. For example, the secure communication link 110 may include a virtual private network (VPN) connection established between the ICS management tool 116 and the ICS management tool administration application 104. In one embodiment, the secure communication link 110 is provided by an ICS secure communication service 108, such as an EMC secure remote Services™ online service that is provided by Dell/EMC Corporation. The EMC secure remote Services™ online service may be beneficial in that it inherently provides secure communication tunnels to several of the other services 108 and other tools used by the system 100. For example, the EMC secure remote Services™ online service may inherently provide a secure communication tunnel to each of the quote versioning service 108c, the third party component management portal service 108, and the data mining service 108.

The ICS management tool administration computing device 102, the ICS management tool computing device 140, the various services 108 described in the present disclosure communicate with one another using a communications network 124. Nevertheless, the ICS management tool administration computing device 102, the ICS management tool computing device 150, the various services 108 may communicate with one another in any suitable manner. For example, the ICS management tool administration computing device 102, the ICS management tool computing device 140, the various services 108 communicate with each other using wireless and/or wired communications. In one embodiment, the ICS management tool administration computing device 102, the ICS management tool computing device 140, the various services 108 communicates with one another using a communication network 124, such as the Internet, an intranet, or another wired and/or wireless communication network. In another embodiment, the ICS management tool administration computing device 102, the ICS management tool computing device 140, the various services 108 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the ICS management tool administration computing device 102, the ICS management tool computing device 140, the various services 108 may communicate with one another without the use of a separate and a distinct network.

The data source 106 stores an ICS configuration record 126 for each ICS administered by the system 100. The ICS configuration record 126 includes a list of sanctioned component records 128 indicating those components 112 that have been sanctioned for use by its respective ICS configuration record 126. The data source 106 also stores ICS parametric records 130, ICS intent element records 132, and ICS intent element reports 134. The ICS parametric records 130 store information associated with any measure performance metrics associated with the operation of the ICS 114. Examples of such performance metrics may include a storage capacity, a throughput performance level, a processing performance, and the like. The ICS intent element records 132 stores intent elements obtained from the data mining service 108, while the ICS intent element reports 134 store information associated with any reports generated by the application 104 based upon any obtained intent elements that meet or exceed a specified certainty factor threshold.

FIG. 10 depicts an example embodiment of a ICS management tool computing device 140 that may be used to execute the ICS management tool 116 according to one embodiment of the present disclosure. The computing device 140 is a computing or processing device that includes a memory 142 for storing the ICS management tool 116 that is executed by one or more processors 144. In general, the ICS management tool 116 manages the operation of the ICS 114. The ICS management tool 116 may also receive data and/or communications from, and/or transmit data and/or communications to, the ICS management tool administration computing device 102 via the communication network 124. The computing device 140 can be a personal computer, such as a laptop or notebook computer, a workstation, or other processing device such as a personal digital assistant or a tablet computer. The computing device 140 includes a display 146, such as a computer monitor, for displaying data and/or a user interface (e.g., a graphical user interface (GUI)) 148. The computing device 140 may also include an input device 150, such as a keyboard or a pointing device (e.g., a mouse, trackball, pen, or touch screen) to enter data into or interact with the user interface 148 for managing the operation of the ICS 114 via the ICS management tool 116.

In one embodiment, the memory 142 also stores remote ICS configuration records 152 that stores information associated with those records that have been sanctioned for use with the ICS 114. For example, the remote ICS configuration records 152 may be copied from the sanctioned component records stored in the data source 106 of the configuration application computing system 102 on an ongoing (e.g., periodic) basis so that management of the ICS 114 may be performed when the communication network 124 is not available (e.g., the computing device 140 is functioning offline). As another example, the remote ICS configuration records 152 may be updated each time a component 112 is added or removed from the list of sanctioned component records 128.

Figure 2A:
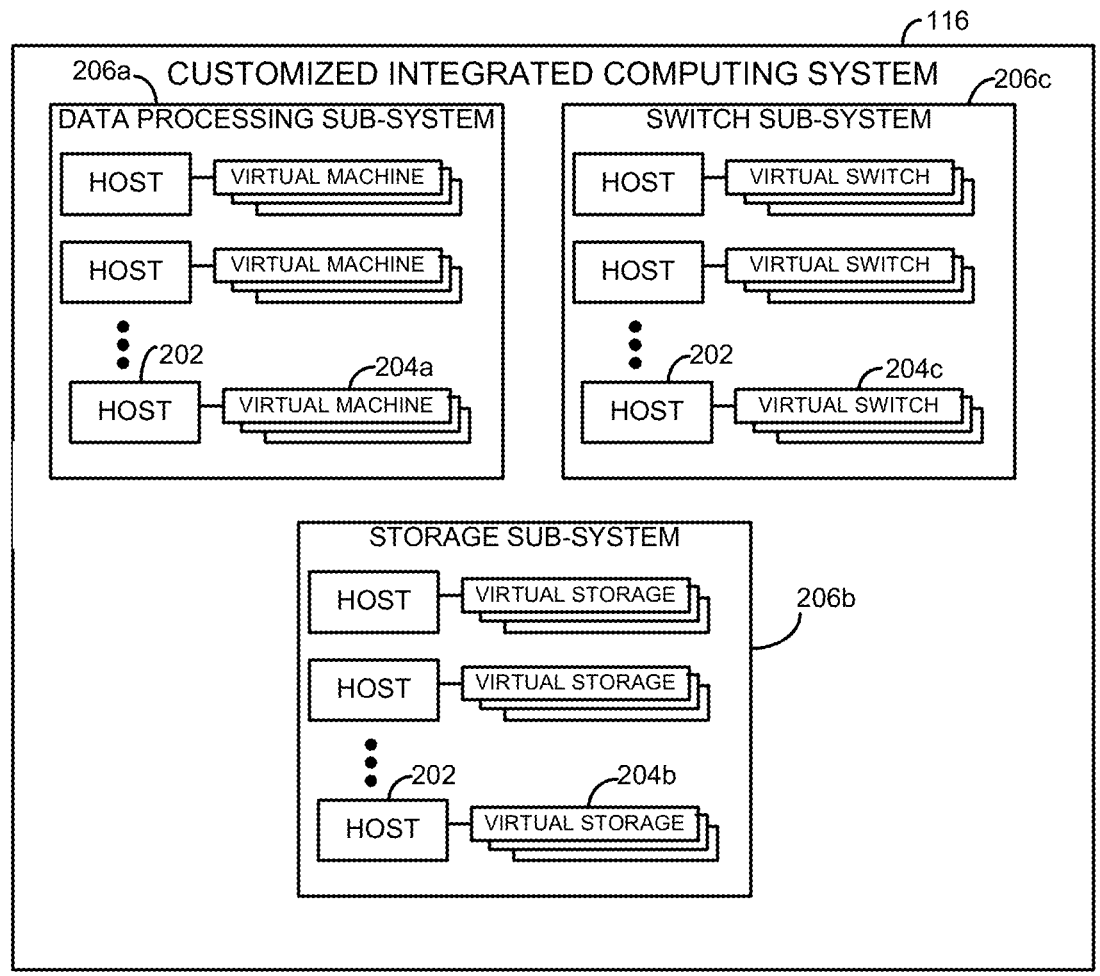
FIGS. 2A and 2B illustrate an example customized integrated computing system that may be configured by the integrated computing system ICS administration application according to one embodiment of the present disclosure.

FIG. 2A illustrates an example customized integrated computing system 114 that may be configured by the integrated computing system ICS administration application 104 according to one embodiment of the present disclosure. The particular example customized integrated computing system 114 as shown is a converged infrastructure package that is optimized for data storage utilizing various forms of redundancy for enhanced availability and reliability. For example, a customized integrated computing system 114 such as that shown includes components includes components found in VBLOCK™ infrastructure packages available from Virtual Computing Environment (VCE) Corporation, which is headquartered in Richardson, Tex. Nevertheless, other embodiments of a customized integrated computing system 114 may include additional, fewer, or different components than shown herein without departing from the spirit and scope of the present disclosure.

The customized integrated computing system 114 implemented as a converged infrastructure may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular customized integrated computing system 114 as shown includes several sub-systems, such as a data processing sub-system 206a, a data storage sub-system 206b, and a switch sub-system 206c. Nevertheless, it should be understood that other converged infrastructures may include additional, fewer, or different types of sub-systems without departing from the spirit and scope of the present disclosure.

In one aspect, the customized integrated computing system 114 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments and converged infrastructure, such as a computer cluster, computing grid, blade array, and/or other converged infrastructure may be managed using the teachings of the present disclosure. For example, a converged infrastructure such as that shown includes components found in Vblock™ System infrastructure packages available from VCE, LLC, which is headquartered in Richardson, Tex.

In one aspect, the data storage sub-system 206b includes computer-readable memory structures for storing data used by the customized integrated computing system 114, which may include network attached storage (NAS) arrays and/or storage area network (SAN) arrays that are facilitated by multiple virtual objects (e.g., virtual storage objects 204b). The switch sub-system 206c provides for communication among the various sub-systems of the customized integrated computing system 114, and may include components, such as fabric interconnect systems, Ethernet switches/routers, multilayer director switches (MDSs), and the like. The data processing sub-system 206a executes applications that access, store, and otherwise manipulate data stored by the customized integrated computing system 114. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more workloads or one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual environment for each VM's operation and controls various aspects of their operation. One example of a suitable hypervisor includes the VMWARE ESX™ software suite that is available from VMware Corporation, which is located in Palo Alto, Calif.

Figure 2B:
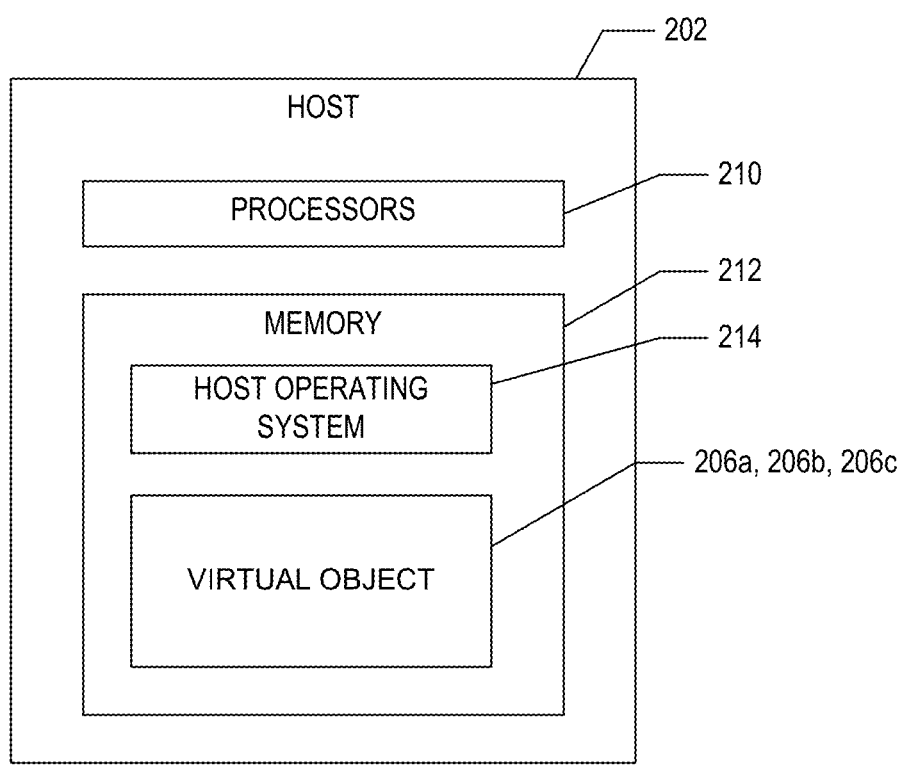

FIG. 2B illustrates an example host 202 implemented on each customized integrated computing system 114 according to one aspect of the application centric compliance management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more workloads or virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

In general, the workloads or virtual objects (e.g., VMs 204a, virtual storage objects 204b, and virtual switch objects 204c) may be implemented as resources of a multi-tier computing environment. Each virtual object may be instantiated or deleted under control of the host operating system 214, which is in turn, controlled by the integrated computing system ICS administration application 104. That is, the host operating system 214 may be controlled by the integrated computing system ICS administration application 104 to instantiate new virtual objects are they are needed and destroyed to alleviate excess capacity in their associated hosts 202.

Although the customized integrated computing system 114 described above discloses one particular type of integrated computing system that may be configured by the integrated computing system ICS administration application 104, it should be understood that the integrated computing system ICS administration application 104 may be used to configure any computing environment that includes multiple components 112 (e.g., computing clusters, computing grids, blade arrays, etc.) may be viable alternatives.

Figure 3:
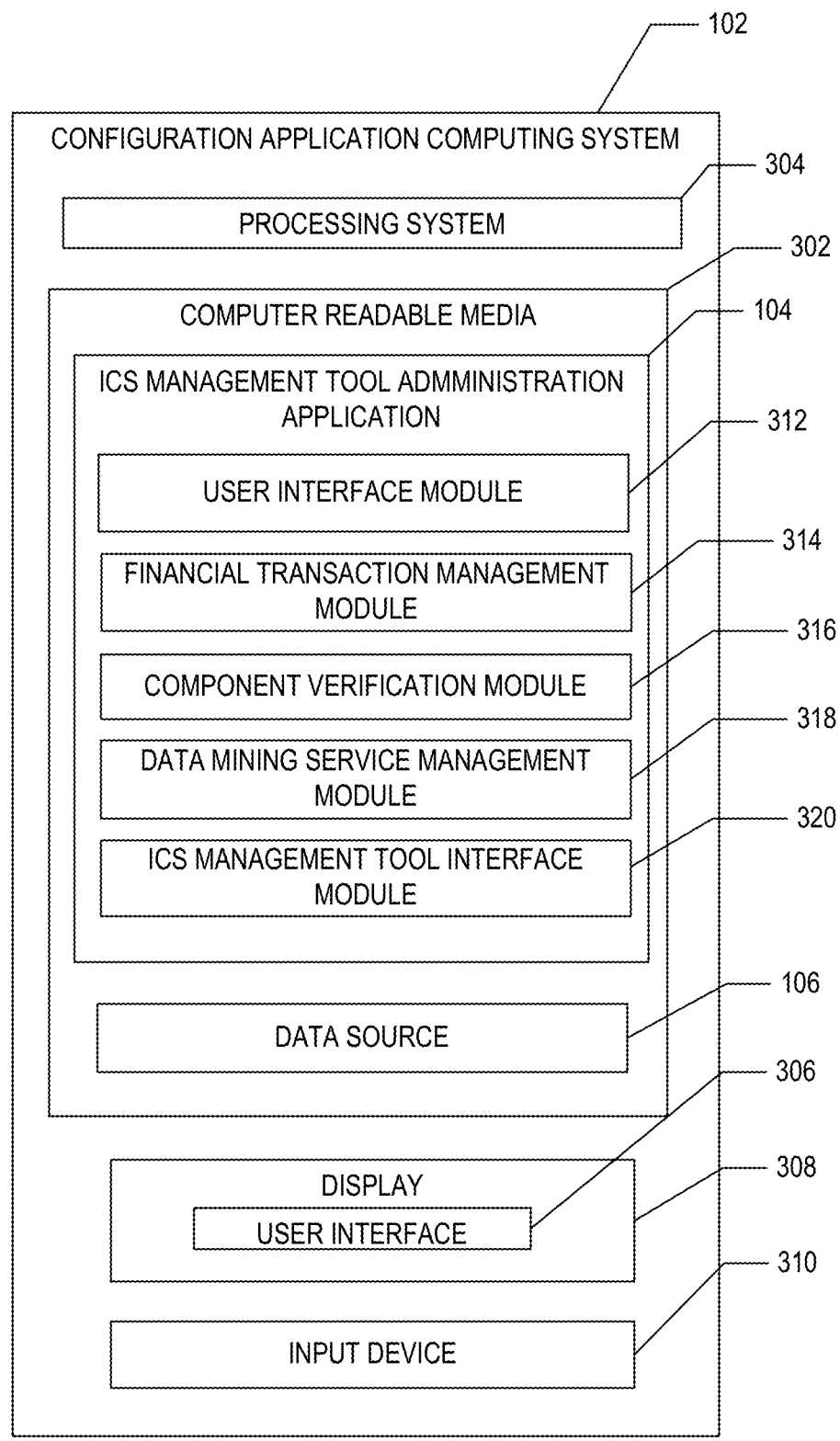
FIG. 3 is a block diagram depicting an example integrated computing system ICS management tool administration application executed on the ICS administration application computing system according to one embodiment of the present disclosure.

Referring now in more detail to FIG. 3, a block diagram of an example integrated computing system ICS administration application 104 executed on the ICS management tool administration computing system 102, is depicted according to one aspect of the present disclosure. The integrated computing system ICS management tool administration application 104 is stored in a computer readable media 302 (e.g., memory) and is executed on a processing system 304 of the ICS administration application computing system 102. For example, the ICS management tool administration application 104 may include instructions that may be executed in an operating system environment, such as a Microsoft Windows™ operating system, a Linux operating system, or a UNIX operating system environment.

The computer readable medium 302 includes volatile media, nonvolatile media, removable media, non-removable media, and/or another available medium. By way of example and not limitation, non-transitory computer readable medium 302 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the computing system 102 also includes a user interface (e.g., a command line interface (CLI), a graphical user interface (GUI), etc.) 306 displayed on a display 308, such as a computer monitor, for displaying data. The ICS administration application computing system 102 also includes an input device 310, such as a keyboard or a pointing device (e.g., a mouse, trackball, pen, or touch screen) to enter data into or interact with the user interface 306. According to one aspect, the application 104 includes instructions or modules that are executable by the processing system 302 as will be described in detail herein below.

A user interface module 312 facilitates the receipt of input data and/or output data from or to a user, respectively. In one example, the user interface 306 may communicate with other modules in the application 104 to receive user input for manipulating or otherwise modifying the operation of the ICS 114. As another example, the user interface module 312 may receive user input for modifying and/or reviewing the ICS configuration record 126 on the display 308.

A financial transaction management module 314 communicates with a payment processing system, such as a financial account system associated with the customer, to transact a monetary transfer of funds from the customer's financial account to a financial account of the ICS provider. In one example, the financial transaction management module 314 includes an application program interface (API) for coordinating a monetary transaction (e.g., online money transfer) through an e-commerce provider, such as PAYPAL™, online credit card systems, or other suitable third party financial clearing entity. In another example, the financial transaction management module 314 encodes monetary transaction information provided by the user and transmits this information to one or more of the other services provided by the system 100, such that those other services may communicate with the financial account system of the customer for transacting funds necessary for entitling any new components added to the ICS 114.

A component verification module 316 communicates with the ICS management tool 116 to ensure that any newly added components 112 have been properly verified to be sanctioned for use in the ICS 114. For example, when the ICS management tool 116 detects the presence of a newly added component, it may check the remote ICS configuration records 152 to determine whether the newly added component 112 has been sanctioned for use in the ICS 114. If no corresponding record of the newly added component is found, it may transmit an indication of the newly added component 112' to the component verification module 316, which checks the ICS configuration record 126 stored in the data source 106 to determine whether the newly added component 112 has been sanctioned for use in the ICS 114. If no corresponding record of the newly added component is found, it may communicate with the entitlement management service 108 to determine whether that component 112 has been sanctioned for use in the ICS 114.

If no corresponding record of the newly added component is found by the entitlement management service 108, the component verification module 316 may then communicate with the user interface module 312 to generate a user interface for soliciting a purchase for the newly added component with the user (e.g., customer) using the financial transaction management module 314. Should the user elect to purchase the entitlement rights for the newly added component 112, the entitlement management service 108 may be updated with the entitlement rights for the newly added component such that, when the aforementioned process is repeated, the sanctioned component records 128 stored in the data source 106 as well as the remote sanctioned component records 128 may be updated and provisioning of the newly added component 112' is allowed. The component verification module 316 communicates with the ICS management tool 116 via the secure communication link 110 for various reasons including reduction or elimination of any tampering with the verification sequence using illicit means (e.g., hacking, spoofing of the verification process, etc.), enhanced security for the customer whose entitlement rights may otherwise be stolen by an external illicit entity, and/or protection from how the entitlement verification process is performed by other would-be illicit users.

In generating the user interface, the component verification module 316 may conduct a dialog with the customer for purchasing entitlement rights to the newly added component 112. For example, if the newly added component 112 has not been properly sanctioned for use in the ICS 114, the component verification module 316 may generate a dialog screen on the user interface 306 for soliciting the customer to enter into a financial agreement for purchasing entitlement rights for the newly added component, and receiving financial information (e.g., credit card information, bank financial transfer information, etc.) from the customer. When the financial information is received from the customer, the component verification module 316 may then communicate with the financial transaction management module 314 to consummate a financial transaction for providing entitlement rights to use the newly added component.

A data mining service management module 318 manages the operation of the data mining service 108 to instruct the data mining service 108 about certain characteristics to look for in communications conducted between the ICS management tool 116 and the other services provided by the system 100. The data mining service management module 318 may also receive and process char information provided by the data mining service 108 to generate reports inferred from the customer's usage of the various features of the system 100. For example, the data mining service management module 318 may receive an intent element from the data mining service 108 indicating that the customer has been accessing the third party component management portal service 108 to view certain components 112 that could be used in a future upgrade configuration. Given this intent element, the data mining service management module 318 would generate a report that could be issued to a suitable entity, such as the sales personnel of the ICS provider who could further process the information to derive one or more potential upgrade configurations, and present these potential upgrade configurations as solicitations to the customer.

An ICS management tool interface module 320 provides an interface to the ICS management tool 116 for transmitting and receiving information about the ICS 114 and how it is being used to control the operation of the ICS 114. For example, the operations management application interface module 320 may communicate with the ICS management tool 116 to receive resource information including which components are being managed as well as how they are being used. In one embodiment, the ICS management tool interface module 320 may communicate with the ICS management tool 116 via the secure communication link 110 for receiving and processing verification requests for newly added components 112, and receiving a processing usage data by the customer, that can in turn, be fed to the data mining service 108 for obtaining intent elements about the customer's usage of the ICS 114.

It should be appreciated that the modules described herein are provided only as examples, and that the application 104 may have different modules, additional modules, or fewer modules than those described herein. For example, one or more modules as described in FIG. 3 may be combined into a single module. As another example, certain modules described herein may be encoded on, and executed on other computing systems, such as on one remotely coupled to the ICS management tool administration computing system 102. Additionally, certain modules, such as the component verification module 316 may be executed on the ICS management tool computing device 140 for verifying any newly added components in a manner that may not require online access to the computing device 104.

Figure 4A:
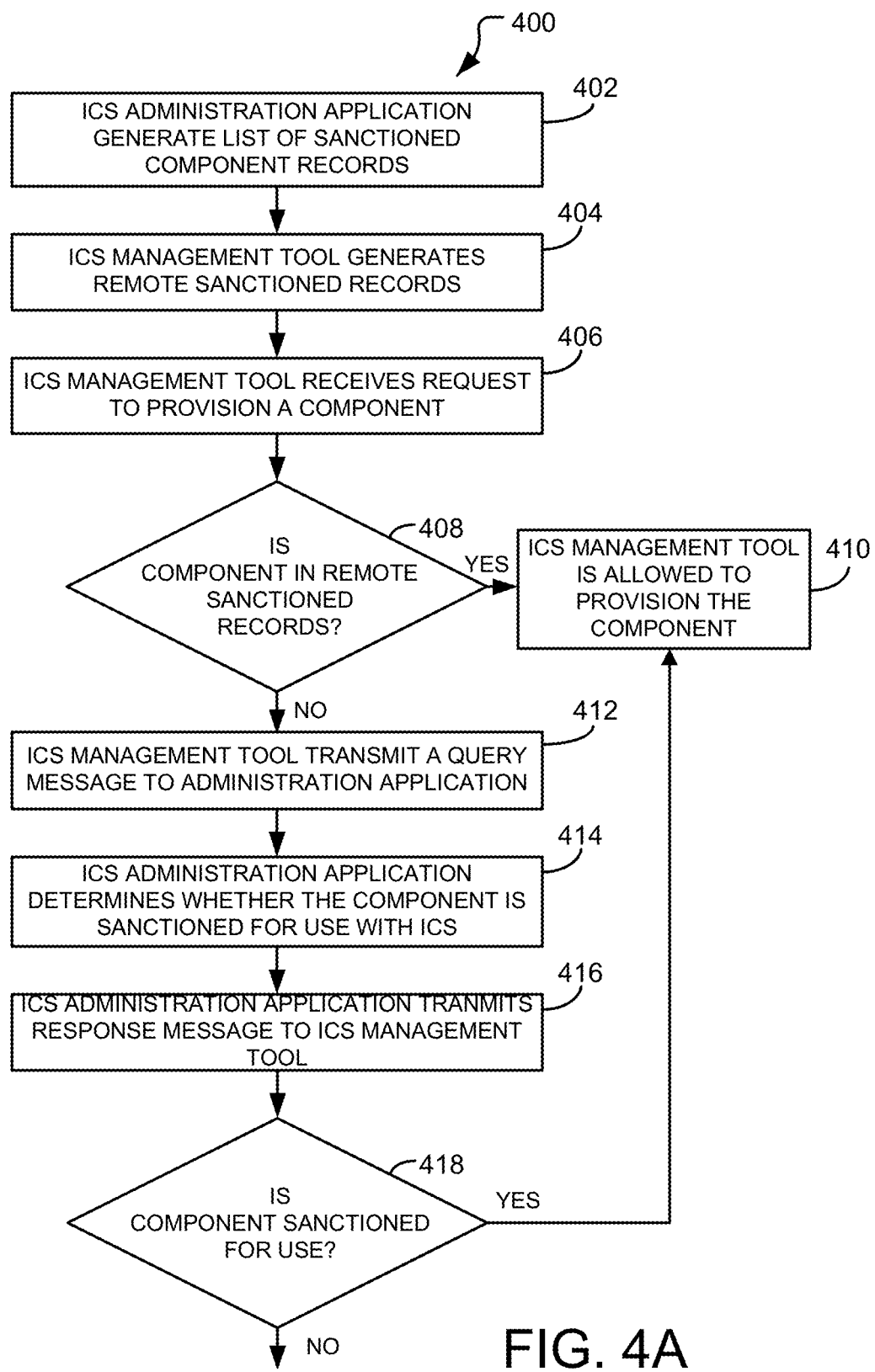
FIGS. 4A and 4B illustrate an example process that may be performed by the system to selectively allow provisioning of a component by verifying that the component has been sanctioned for use with an ICS according to one embodiment of the present disclosure.
Figure 4B:
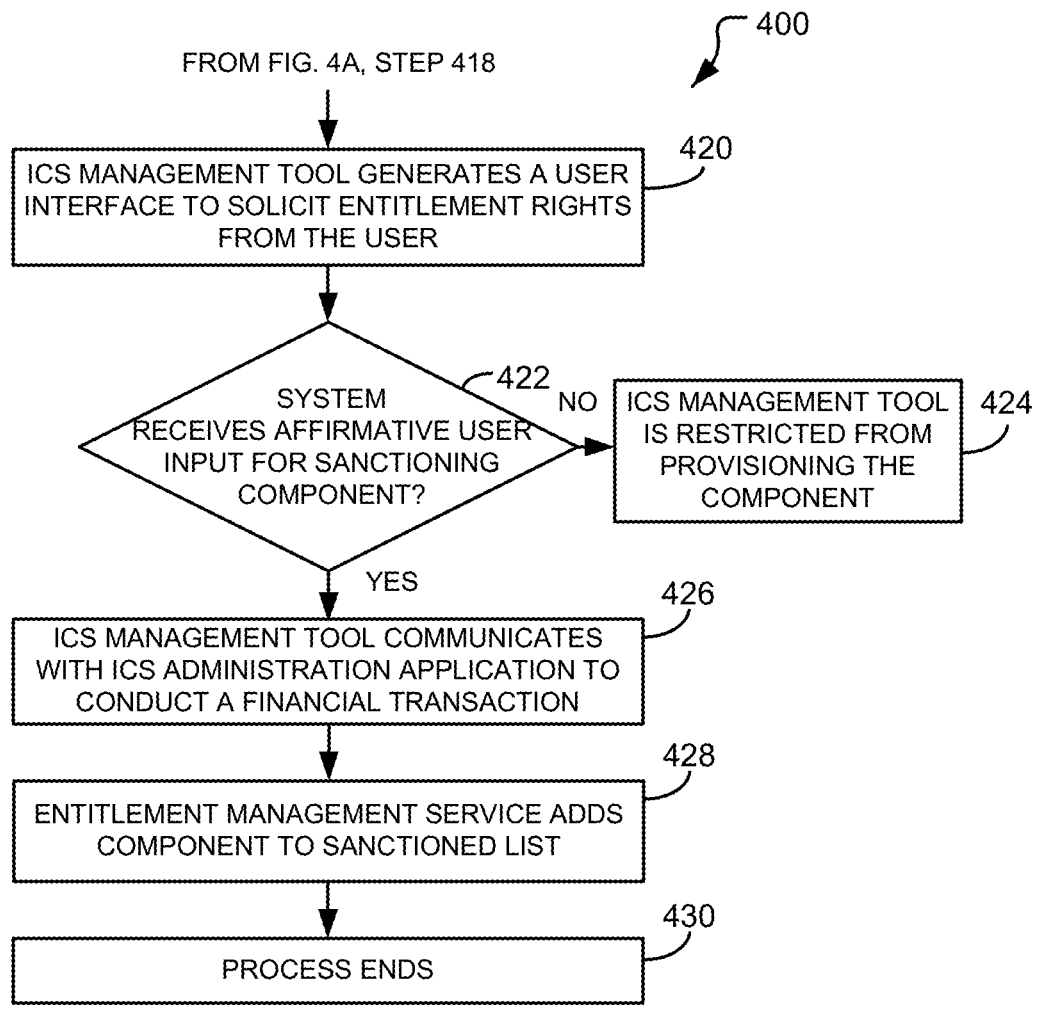

FIGS. 4A and 4B illustrate an example process that may be performed by the system 100 to selectively allow provisioning of a component 112 by verifying that the component 112 has been sanctioned for use with an ICS 114 according to one embodiment of the present disclosure.

Initially at step 402, the ICS management tool administration application 104 may generate a list of sanctioned component records 128 to be associated with the ICS 114, and store the sanctioned records 128 in the data source 106. For example, the ICS management tool administration application 104 may access the entitlement management service 108b to obtain information associated with the components 112 that have been sanctioned for use with the ICS 114, and store the information as sanctioned component records 128 in the data source 106. In one embodiment, the ICS management tool administration application 104 may access the entitlement management service 108b on a periodic basis (e.g., once a day, etc.) to ensure that the sanctioned component records 128 reflect the latest list of sanctioned component records 128 for each respective ICS 114 managed by the system 100.

At step 404, the ICS management tool 116 may access the ICS management tool administration application 104 to obtain the sanctioned components records 128, store those component records 128 as remote sanctioned component records 152 in the ICS management tool computing device 140. Such a behavior may be useful for ensuring that the management of the ICS 114 by the ICS management tool 116 may be continued in the event that the secure communication link 110 ceases to function properly (e.g., goes down). In one embodiment, the ICS management tool 116 may access the ICS management tool administration application 104 on a periodic basis (e.g., once a day, etc.) to ensure that the sanctioned component records 128 reflect the latest list of sanctioned component records 128 (e.g., synchronize the sanctioned component records 128 stored in the data source 106 with those stored in the ICS management tool computing device 140. In another embodiment, the ICS management tool 116 may receive one or more messages from the ICS management tool administration application 104 that one or more new components 112 have been sanctioned for use in the ICS 114, and store information with the newly sanctioned components in the remote sanctioned component records 128. In other embodiments, step 404 may be omitted if offline verification of sanctioned components 112 is not needed or desired.

At step 406, the ICS management tool 116 receives a request, via the user interface 306, to provision a component 112 of the ICS 114. For example, the request may include a particular provisioning action to be performed on the component 112 and a unique identity of the component 112, such as a serial number of the component 112 to be provisioned by the ICS management tool 116. In response to receipt of the request, the ICS management tool 116 may compare the unique identify of the component with the remote sanctioned component records 128 stored in the ICS management tool computing device 140 at step 408. If information associated with the component 112 exists in the remote sanctioned component records 128, processing continues at step 410 in which the ICS management tool 116 is allowed to perform the provisioning action on the component 112. Otherwise, processing continues at step 412 in which the ICS management tool 116 transmits a query message to the ICS management tool administration application 104 to query whether information associated with the component 112 is stored in the data source 106 of the ICS management tool administration computing device 102.

At step 414, the ICS management tool administration application 104 determines whether the component 112 identified in the query message is sanctioned for use by the ICS 114. For example, the ICS management tool administration application 104 may query the entitlement management service 108 to determine whether the component 112 has been sanctioned (e.g., purchased for use with the ICS 114). Thereafter at step 416, the ICS management tool administration application 104 transmits a response message to the ICS management tool 116 indicating the results of the determination.

At step 418, the ICS management tool 116 receives the results of the determination and when the component 112 has been verified to be sanctioned for use, processing continues at step 410 in which the ICS management tool 116 is allowed to perform the provisioning action on the component 112. Otherwise, processing continues at step 420. Additionally, if information associated with the newly added component 112' has not been previously included in the remote sanctioned components records 152, the ICS management tool 116 may update the remote sanctioned component records 128 for ensuing requests to provision the newly added component 112'.

At step 420, the ICS management tool 116 may generate a user interface screen soliciting the user of the ICS management tool 116 to purchase entitlement rights for the use of the newly added component 112' with the ICS 114. At step 422, if the ICS management tool 116 receives user input for requesting entitlement rights, processing continues at step 426; otherwise processing continues at step 424 in which the ICS management tool 116 is restricted from provisioning the component 112. At step 426, the ICS management tool 116 may communicate with the ICS management tool administration application 104 to conduct a financial transaction for purchasing the entitlement rights for the use of the component 112. Once the financial transaction has been consummated, the entitlement management service 108b adds information associated with the component 112 to the remote sanctioned component records 128 so that ensuing queries for existence of the component may be acknowledged by the entitlement management service 108b at step 428.

The aforedescribed process may be continued to verify that the same or other components are sanctioned for use with the ICS 114. For example, after the component 112 described in steps 402 to 422 have been sanctioned for use via a financial transaction, step 406 may be performed again at an ensuing attempt to perform a provisioning action. Alternatively, step 402 may be performed again to generate a new list of sanctioned component records 128 that may be used on successive attempts to provision the component 112. Nevertheless, the process ends at step 430.

Figure 5:
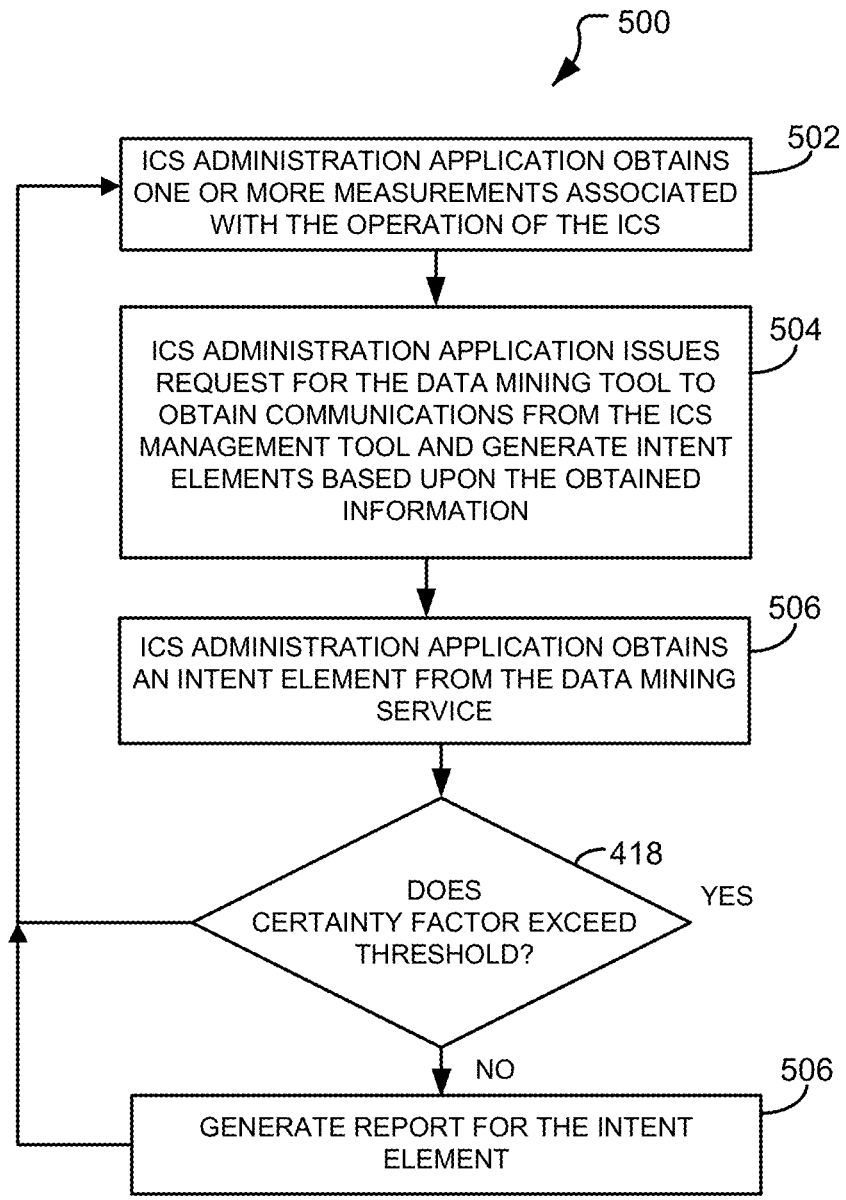
FIG. 5 illustrates another example process that may be performed by the system to perform analytics based upon the usage of the ICS by the customer and generate report indicating certain usage characteristics according to one embodiment of the present disclosure.

FIG. 5 illustrates another example process that may be performed by the system 100 to perform analytics based upon the usage of the ICS 114 by the customer and generate report indicating certain usage characteristics according to one embodiment of the present disclosure.

At step 502, the system 100 may obtain one or more measurements associated with the usage of the ICS 114. For example, the ICS management tool administration application 104 may obtain certain parametric measurements associated with the operation of the ICS 114, such as a storage capacity of the ICS 114, a processing performance of the ICS 114, and/or a throughput level of communications conducted within the ICS 114, and the like, and store the obtained information as ICS parametric data records 130 in the data source 106.

At step 504, the ICS management tool administration application 104 issues a request to the data mining service 108 to obtain (e.g., sniff) communications conducted by the ICS management tool 116, such as those that may be conducted with the various services (e.g., quote versioning service 108c, entitlement management service 108b, third party component management portal service 108e, etc.) in the system and to generate one or more intent elements from the obtained communications. For example, the ICS management tool administration application 104 may issue a request for the data mining service 108 to begin reading communications conducted between the ICS management tool 116 and the quote versioning service 108c and/or the modeling tool 120 to determine what additional components 112 that the customer has been researching online. When the data mining service 108 obtains this information to infer one or more intent elements associated with the information. An intent element may be any form of information that describes how or why the customer of the ICS 114 may be conducting such communications. One example intent element may include a particular configuration that the customer desires for the ICS 114. Another example intent element may include information associated with a particular type of application that the customer desires to execute on the ICS 114.

In one embodiment, the data mining service 108 may use the ICS parametric data records 130 to assist in inferring certain intent elements. For example, the data mining service 108 may access the ICS parametric data records 130 to identify a processing performance level experienced by the ICS 114 and compare the processing performance against certain communications conducted by the customer to infer that the customer desires to increase the processing capabilities of the ICS 114.

In another embodiment, certain intent elements may include a time-based factor. For example, the data mining service 108 may process the obtained information to infer that a frequency or occurrence of a particular type of communication has been increasing in intensity. Thus, the data mining service 108 may infer via the increased frequency of occurrence that the customer has a heightened interest as time has progressed, and include this time-based factor in the intent element reported to the ICS management tool administration application 104.

At step 506, the ICS management tool administration application 104 receives the intent elements from the data mining service 108. In one embodiment, the intent elements may each include a certainty factor indicating a level of confidence in the inferred intent element. That is, an intent element based upon a relatively large quantity of information instances may have a higher certainty factor than another intent element based upon a lower quantity of information instances.

At step 508, the ICS management tool administration application 104 determines whether the certainty factor associated with a particular intent element has exceeds a specified threshold level. If so, the ICS management tool administration application 104 may generate a report at step 510. Thus, when the certainty factor for an intent element exceeds a certain specified threshold, only those intent elements having a certain minimum level of interest are reported.

In one embodiment, the report may include a message that is transmitted to a particular address, such as an email address of the sales force of the ICS provider. As such, a member of the ICS provider's sales force may use the report to generate one or more proposed upgrade configurations that can be proposed to the customer. In another embodiment, the ICS management tool administration application 104 may generate additional information to be included in the report. For example, when the ICS management tool administration application 104 obtains an intent element, it may further process the information included in the intent element to generate a message, such as an e-mail message including formatted pro-forma text that can be sent to the customer in the form of an advertisement for selling additional components 112 to the customer.

The process as described above with reference to FIGS. 4A through 5 may be particularly well suited for use with the secure communication link 110. For example, the secure communication link 110 may provide for a relatively high level of integrity by reducing potential malicious actions by the customer or other external entity on the network 124. For example, the secure communication link 110 may reduce or eliminate piracy techniques, such as spoof messages that could intercept and generate falsified entitlement rights for use of the components 112 of the ICS 114 by the customer or some other external entity who would otherwise rob, steal, or adversely manipulate those entitlement rights. Additionally, the secure communication link 110 may reduce or eliminate the adverse effects of other piracy techniques, such as man-in-the-middle attacks in which communications could be diverted to another ICS 114 for illicitly stealing those entitlement rights that have been destined for its proper customer. The secure communication link 110 may also provide for the integrity of the information provided by the data mining service 108 by ensuring only relevant communications from a specified ICS 114 installation are obtained and processed to derive intent elements associated only with its respective ICS installation.

Although the description of FIGS. 4A through 5 describe several example processes that may be performed by the system 100 to sanction a component 112 for use in an ICS 114 and to mine and process data associated with the operation of the ICS 114, the features of the disclosed processes may be embodied in other specific forms without deviating from the spirit and scope of the present disclosure. For example, the system 100 may perform additional, fewer, or different steps than those steps as described in the present examples. As another example, certain steps of the processes described herein may be performed by other services and/or computing devices external to the system 100, such as another online service that communicates with the computing system 102 using a communication network such as may be available via the Internet.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
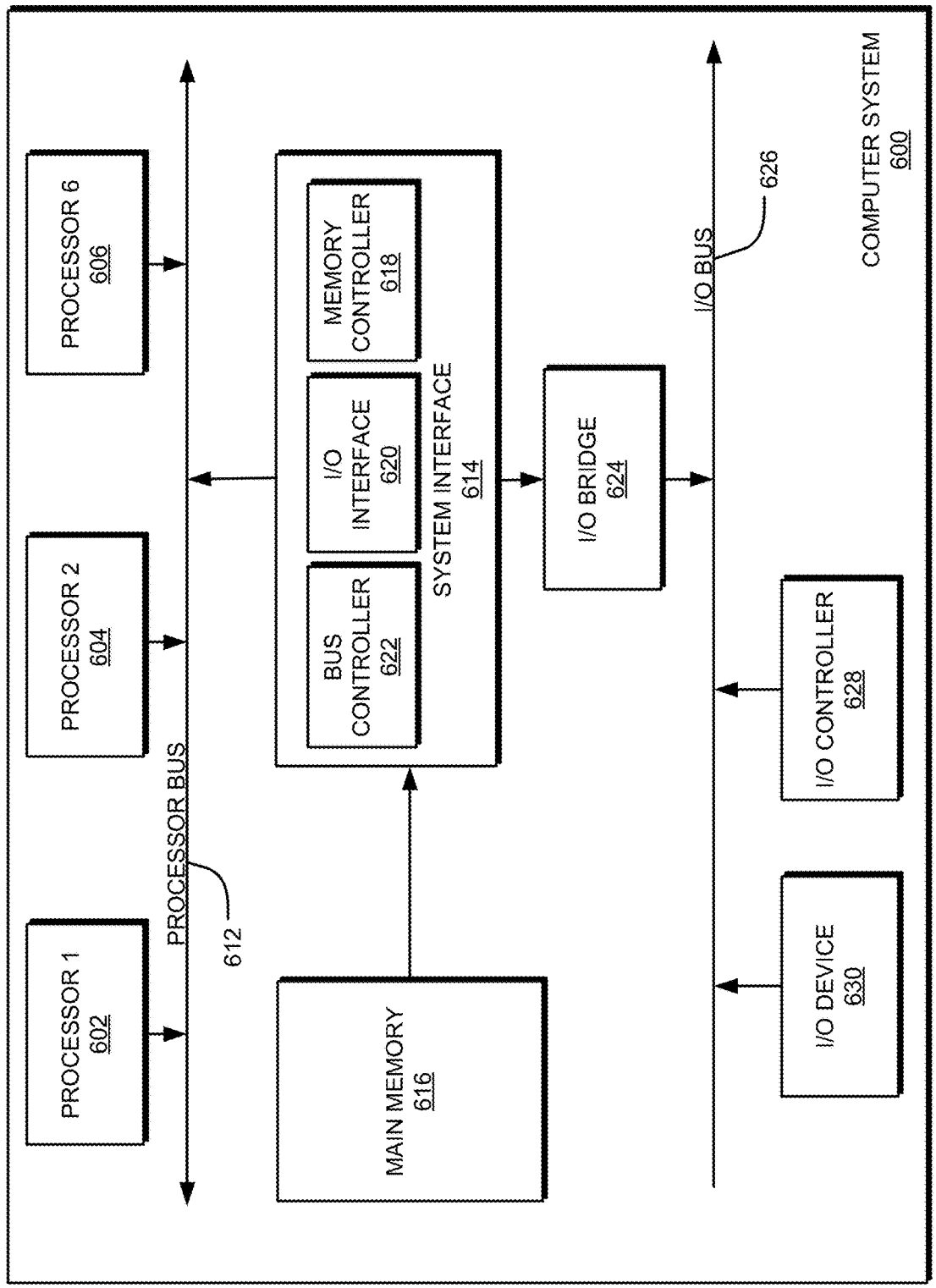
FIG. 6 is a block diagram illustrating an example of a computing device or computer system which may be used in implementing the embodiments of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O devices 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An integrated computing system configuration system comprising:
    a computing system comprising at least one processor and at least one memory to store instructions that are executed by the at least one processor to:
        obtain, using a data mining system, one or more communications from an integrated computing system (ICS) management system to an ICS modeling system;
        compare the one or more communications to parametric data records of a deployed ICS to determine an intent element intended for inclusion in the ICS;
        receive, from a requesting service, a request to provision the intent element as a component of the ICS;
        determine whether the component has been sanctioned for use with the ICS by:
            establishing a secure communications link with the requesting service;
            accessing, over the secure communications link, identifying information associated with the component; and
            comparing the identifying information with a plurality of sanctioned component records stored in the at least one memory;
        when the component has been sanctioned for use with the ICS, allow provisioning of the component; and
        when the component has not been sanctioned for use with the ICS, restrict provisioning of the component until receiving an update from an entitlement management service, the update comprising a record of a financial transaction associated with the requesting service and the component, the entitlement management service processing the financial transaction and storing a component record, associated with the component and the financial transaction, with the plurality of sanctioned component records in the at least one memory.

2. The integrated computing system configuration system of claim 1, wherein the instructions are further executed to, when the identifying information is not found in the sanctioned component records, communicate with an administration computing device to determine whether the component has been sanctioned for use on the ICS, the administration computing device comparing the identifying information with another plurality of sanctioned component records stored in a memory of the administration computing device.

3. The integrated computing system configuration system of claim 2, wherein the administration computing device is executed to obtain the sanctioned component records from an online entitlement management service.

4. The integrated computing system configuration system of claim 2, wherein the instructions are further executed to communicate with the administration computing device using an online secure communication service.

5. The integrated computing system configuration system of claim 1, wherein the instructions are further executed to generate a user interface for receiving user input for soliciting the financial transaction to sanction the component for use in the ICS.

6. The integrated computing system configuration system of claim 1, further comprising a second computing system comprising at least one second processor and at least one second memory to store a second set of instructions that are executed by the at least one second processor to:
    communicate with the data mining service to receive the intent element associated with the use of the ICS; and
    generate a report based upon the intent element.

7. The integrated computing system configuration system of claim 6, wherein the second set of instructions are further executed to generate the report when the intent element has a certainty factor that exceeds a specified threshold.

8. The integrated computing system configuration system of claim 6, wherein the report comprises a solicitation to sell additional components to an administrator of the ICS.

9. An integrated computing system configuration method comprising:
    obtaining, using a data mining system and using executable instructions stored in a non-transitory medium and executed on at least one processor, one or more communications from an integrated computing system (ICS) management system to an ICS modeling system;

comparing the one or more communications to parametric data records of a deployed ICS to determine an intent element intended for inclusion in the ICS;

receiving, from a requesting service, a request to provision the intent element as a component of an ICS;

determining, using the instructions, whether the component has been sanctioned for use with the ICS by:

establishing a secure communications link with the requesting service;

accessing, over the secure communications link, identifying information associated with the component; and comparing the identifying information with a plurality of sanctioned component records stored in at least one memory;

when the component has been sanctioned for use with the ICS, allowing, using the instructions, provisioning of the component;

when the component has not been sanctioned for use with the ICS, restricting, using the instructions, provisioning of the component until receiving an update from an entitlement management service, the update comprising a record of a financial transaction associated with the requesting service and the component, and the entitlement management service processing the financial transaction and storing a component record, associated with the component and the financial transaction, with the plurality of sanctioned component records in the at least one memory.

10. The integrated computing system configuration method of claim 9, further comprising when the identifying information is not found in the sanctioned component records, communicating with an administration computing device to determine whether the component has been sanctioned for use on the ICS, the administration computing device comparing the identifying information with another plurality of sanctioned component records stored in a memory of the administration computing device.

11. The integrated computing system configuration method of claim 10, further comprising wherein the administration computing device is executed to obtain the sanctioned component records from an online entitlement management service.

12. The integrated computing system configuration method of claim 10, further comprising communicating with the administration computing device using an online secure communication service.

13. The integrated computing system configuration method of claim 9, further comprising generating a user interface for receiving user input for soliciting the financial transaction to sanction the component for use in the ICS.

14. The integrated computing system configuration method of claim 9, further comprising:

communicating with the data mining service to receive the intent element associated with the use of the ICS; and generating a report based upon the intent element.

15. The integrated computing system configuration method of claim 14, further comprising generating the report when the intent element has a certainty factor that exceed a specified threshold.

16. The integrated computing system configuration method of claim 14, wherein the report comprises a solicitation to sell additional components to an administrator of the ICS.

17. Code implemented in a non-transitory, computer readable medium that when executed by at least one processor, is operable to perform at least the following:

obtaining, using a data mining system, one or more communications from an integrated computing system (ICS) management system to an ICS modeling system;

comparing the one or more communications to parametric data records of a deployed ICS to determine an intent element intended for inclusion in the ICS;

receiving, from a requesting service, a request to provision a component of the ICS;

determining whether the component has been sanctioned for use with the ICS by:

establishing a secure communications link with the requesting service;

accessing, over the secure communications link, identifying information associated with the component; and comparing the identifying information with a plurality of sanctioned component records stored in at least one memory;

when the component has been sanctioned for use with the ICS, allowing provisioning of the component;

when the component has not been sanctioned for use with the ICS, restricting provisioning of the component until receiving an update from an entitlement management service, the update comprising a record of a financial transaction associated with the requesting service and the component, and the entitlement management service processing the financial transaction and storing a component record, associated with the component and the financial transaction, with the plurality of sanctioned component records in the at least one memory.

18. The code of claim 17, further operable to perform when the identifying information is not found in the sanctioned component records, communicating with an administration computing device to determine whether the component has been sanctioned for use on the ICS, the administration computing device comparing the identifying information with another plurality of sanctioned component records stored in a memory of the administration computing device.

19. The code of claim 18, further operable to perform wherein the administration computing device is executed to obtain the sanctioned component records from an online entitlement management service.

20. The code of claim 18, further operable to perform communicating with the administration computing device using an online secure communication service.

* * * * *